United States Patent
Fukuda et al.

(10) Patent No.: US 8,374,761 B2
(45) Date of Patent: Feb. 12, 2013

(54) DRIVING FORCE DISTRIBUTION CONTROL METHOD AND DEVICE FOR FOUR WHEEL DRIVE VEHICLE

(75) Inventors: Yoshiyuki Fukuda, Kawasaki (JP); Tomoaki Fujibayashi, Commerce Township, MI (US); Hideyuki Arai, Isehara (JP)

(73) Assignees: Nissan Motor Co., Ltd., Yokohama-shi (JP); Hitachi, Ltd., Tokyo (JP)

(*) Notice: Subject to any disclaimer, the term of this patent is extended or adjusted under 35 U.S.C. 154(b) by 780 days.

(21) Appl. No.: 12/186,081

(22) Filed: Aug. 5, 2008

(65) Prior Publication Data

US 2009/0043469 A1  Feb. 12, 2009

(30) Foreign Application Priority Data

Aug. 7, 2007  (JP) ................. 2007-205592

(51) Int. Cl.
| B60K 28/16 | (2006.01) |
| G06F 17/00 | (2006.01) |
| B60T 8/24 | (2006.01) |
| B60T 8/58 | (2006.01) |

(52) U.S. Cl. ............... 701/69; 701/72; 701/89; 180/197
(58) Field of Classification Search .............. 701/69–72, 701/74, 75, 82, 84, 88, 89; 180/197, 170
See application file for complete search history.

(56) References Cited

U.S. PATENT DOCUMENTS

| 5,742,917 A | * | 4/1998 | Matsuno | 701/69 |
| 5,850,616 A | * | 12/1998 | Matsuno et al. | 701/82 |
| 5,897,601 A | * | 4/1999 | Suzuki | 701/78 |
| 2004/0064239 A1 | | 4/2004 | Nagura et al. | |

FOREIGN PATENT DOCUMENTS

| EP | 1 203 688 A2 | 5/2002 |
| EP | 1 400 390 A2 | 3/2004 |
| JP | 02-038139 A | 2/1990 |
| JP | 5-278490 A | 10/1993 |
| JP | 2003-231428 A | 8/2003 |
| JP | 2004-106649 A | 4/2004 |
| JP | 2006-341827 A | 12/2006 |

* cited by examiner

*Primary Examiner* — Thomas Tarcza
*Assistant Examiner* — Edward Pipala
(74) *Attorney, Agent, or Firm* — Foley & Lardner LLP

(57) ABSTRACT

A driving force distribution control device for a four wheel drive vehicle having a mechanism that distributes the torque of an engine, which is transmitted to a main drive wheel, to a secondary drive wheel determines a first torque to be distributed to the secondary drive wheel on the basis of the engine torque, and corrects the determined first torque on the basis of a yaw rate deviation between a target yaw rate and an actual yaw rate of the vehicle. When an absolute value of the yaw rate deviation is equal to or greater than a predetermined value, the mechanism is controlled on the basis of the corrected torque.

10 Claims, 6 Drawing Sheets

DRIVING FORCE DISTRIBUTION CONTROL METHOD AND DEVICE FOR FOUR WHEEL DRIVE VEHICLE

FIELD OF THE INVENTION

This invention relates to a driving force distribution control method and device for a four wheel drive vehicle, which controls a distribution ratio of engine torque transmitted to a front wheel and a rear wheel.

BACKGROUND OF THE INVENTION

In a four wheel drive vehicle, a mechanism including a torque distribution clutch, a generator and a motor is known as a mechanism that distributes a torque of an engine, which is transmitted to a main drive wheel, to a secondary drive wheel. In a four wheel drive vehicle having the torque distribution clutch, an engaging force of the clutch is determined on the basis of a rotation speed difference between a front wheel and a rear wheel. Further, in a related art, a correction coefficient is determined on the basis of a deviation between a target yaw rate and an actual yaw rate, and a torque distribution clutch is controlled on the basis of a corrected clutch engaging force determined by multiplying the clutch engaging force by the correction coefficient (see JP5-278490A).

SUMMARY OF THE INVENTION

However, when the vehicle turns on a slippery road surface, for example, both the rotation speed difference between the front and rear wheels and the deviation between the target yaw rate and the actual yaw rate vary. Hence, with the above technique, the pre-correction clutch engaging force, which serves as a base, and the correction coefficient both vary, and therefore hunting may occur during control of the secondary drive wheel.

It is therefore an object of this invention to suppress hunting occurring during control of a secondary drive wheel, even when a rotation speed difference between a main drive wheel and a secondary drive wheel varies.

In order to achieve the above object, this invention provides a driving force distribution method for a four wheel drive vehicle, in which a torque of an engine is distributed to a main drive wheel, to which the torque is transmitted during two wheel driving, and a secondary drive wheel, to which a part of the torque is transmitted during four wheel driving, comprising calculating a first torque to be distributed to the secondary drive wheel on the basis of the torque of the engine, detecting a yaw rate of the vehicle, calculating a target yaw rate of the vehicle, calculating a deviation between the calculated target yaw rate and the detected yaw rate, correcting the first torque on the basis of the yaw rate deviation, detecting a rotation speed of the main drive wheel, detecting a rotation speed of the secondary drive wheel, calculating a rotation speed difference between the rotation speed of the main drive wheel and the rotation speed of the secondary drive wheel, calculating a second torque to be distributed to the secondary drive wheel on the basis of the calculated rotation speed difference, and distributing a larger torque of the first torque and the second torque to the secondary drive wheel when an absolute value of the yaw rate deviation is smaller than a predetermined value, and distributing a corrected first torque corrected on the basis of the yaw rate deviation to the secondary drive wheel when the absolute value of the yaw rate deviation is equal to or larger than the predetermined value.

In order to achieve the above object, this invention further provides a driving force distribution control device for a four wheel drive vehicle having a mechanism that distributes a torque of an engine, which is transmitted to a main drive wheel, to a secondary drive wheel, comprising a first torque calculation unit that calculates a first torque to be distributed to the secondary drive wheel on the basis of the torque of the engine, a yaw rate detection unit that detects a yaw rate of the vehicle, a target yaw rate calculation unit that calculates a target yaw rate of the vehicle, a yaw rate deviation calculation unit that calculates a yaw rate deviation between the calculated target yaw rate and the detected yaw rate, a torque correction unit that corrects the first torque on the basis of the yaw rate deviation, a rotation speed difference calculation unit that calculates a rotation speed difference between the main drive wheel and the secondary drive wheel, a second torque calculation unit that calculates a second torque to be distributed to the secondary drive wheel by the mechanism on the basis of the rotation speed difference and a control unit that controls the mechanism so as to distribute a larger torque of the first torque and the second torque to the secondary drive wheel when an absolute value of the yaw rate deviation is smaller than a predetermined value, and controls the mechanism so as to distribute a corrected first torque corrected by the torque correction unit to the secondary drive wheel when the absolute value of the yaw rate deviation is equal to or larger than the predetermined value.

The details as well as other features and advantages of this invention are set forth in the remainder of the specification and are shown in the accompanying drawings.

DESCRIPTION OF THE PREFERRED EMBODIMENTS

Figure 1:
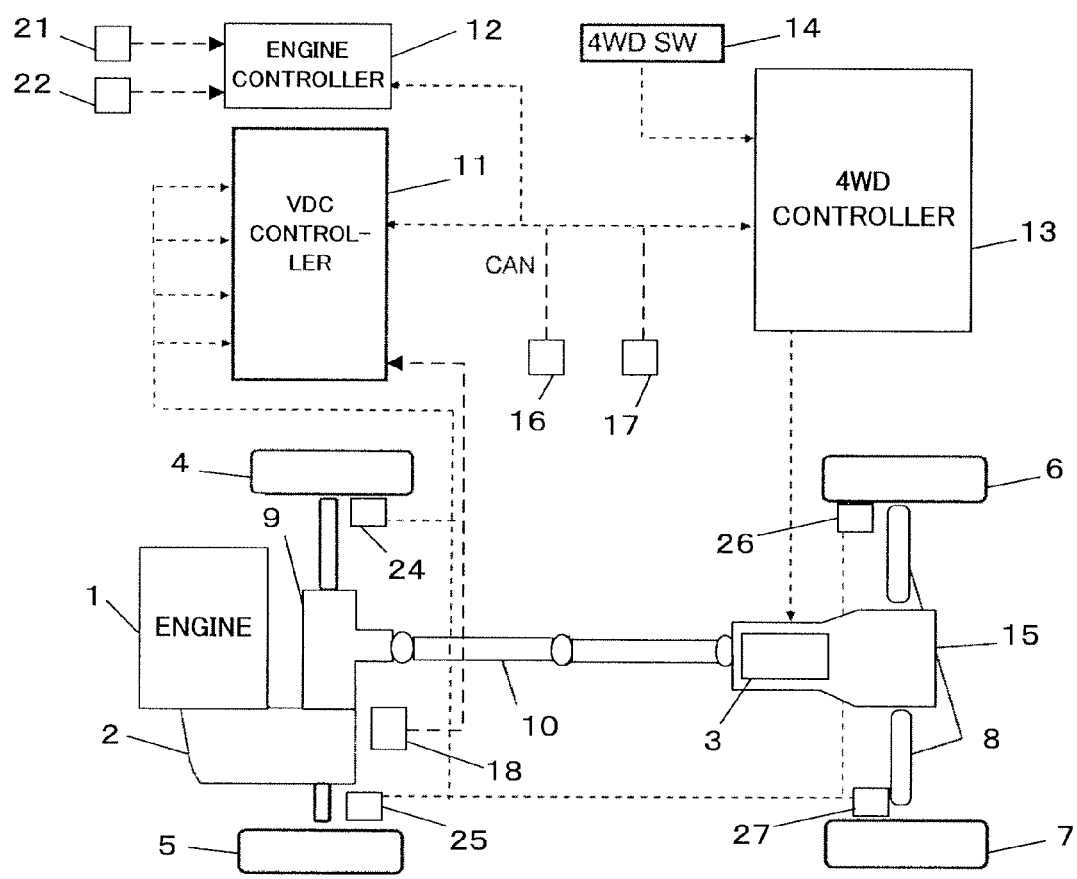
FIG. 1 is an overall system diagram of a driving force distribution control device for a four wheel drive vehicle according to an embodiment.

FIG. 1 is an overall system diagram of a driving force distribution control device for a four wheel drive vehicle according to an embodiment. A four wheel drive vehicle to which this driving force distribution control device is applied is a front wheel drive-based four wheel drive vehicle. In other words, the front wheel serves as a main drive wheel, and the rear wheel serves as a secondary drive wheel.

The driving force of an engine 1 is transmitted directly to left and right front wheels 4, 5 via an automatic transmission 2 and a front differential 9. Further, the driving force of the engine 1 is transmitted to left and right rear wheels 6, 7 via a propeller shaft 10, a torque distribution clutch 3, a rear differential 15, and a rear wheel drive shaft 8.

In this front wheel drive-based four wheel drive vehicle, when a clutch engaging force of the torque distribution clutch 3 increases, the torque distribution ratio of the rear wheels increases. For example, when the torque distribution clutch 3 is disengaged, the front wheel-rear wheel torque distribution ratio equals 100:0, but when the torque distribution clutch 3 is engaged by at least ½ the engine torque, an equal torque distribution ratio of front wheel:rear wheel=50:50 is obtained. In other words, the engaging torque of the torque distribution clutch 3 is controlled such that the distribution ratio of the torque transmitted to the front wheels 4, 5 and rear wheels 6, 7 stays within a range of front wheel:rear wheel=100 to 50:0 to 50. It should be noted that the sum total of the distribution ratios of the front wheels 4, 5 and rear wheels 6, 7 is always set at 100.

A VDC controller 11, an engine controller 12, and a 4WD controller 13 are all connected to each other and are capable of exchanging various types of information through CAN communication.

Wheel speed sensors 24 to 27 output wheel speed signals corresponding respectively to the wheel speeds of the respective wheels 4 to 7 to the VDC controller 11. A steering angle sensor 18 outputs a steering angle signal corresponding to a steering angle of a steering wheel to the VDC controller 11.

On the basis of the wheel speed signals input from the wheel speed sensors 24 to 27, the VDC controller 11 calculates the wheel speeds of the respective wheels 4 to 7, and on the basis of the steering angle signal input from the steering angle sensor 18, the VDC controller 11 calculates the steering angle.

The engine controller 12 determines the engine torque on the basis of an accelerator opening signal input from an accelerator opening sensor 21 and an engine rotation speed signal input from an engine rotation speed sensor 22. A known method may be used as the method of determining the engine torque on the basis of the accelerator opening and the engine rotation speed.

A yaw rate sensor 16 detects a yaw rate of the vehicle and outputs the detected yaw rate to the respective controllers 11 to 13. A front-rear acceleration sensor 17 detects acceleration in a front-rear direction of the vehicle and outputs the detected acceleration to the respective controllers 11 to 13.

A 4WD switch 14 is a switch that is operated by a driver to switch between 2WD and 4WD.

The 4WD controller 13 determines a clutch engaging force of the torque distribution clutch 3 on the basis of a signal input from the 4WD switch 14, a signal input from the VDC controller 11, a signal input from the engine controller 12, a signal input from the yaw rate sensor 16, and a signal input from the front-rear acceleration sensor 17. The 4WD controller 13 outputs a clutch control signal corresponding to the determined clutch engaging force to the torque distribution clutch 3. Clutch control of the torque distribution clutch 3 is performed on the basis of the clutch control signal.

Figure 2:
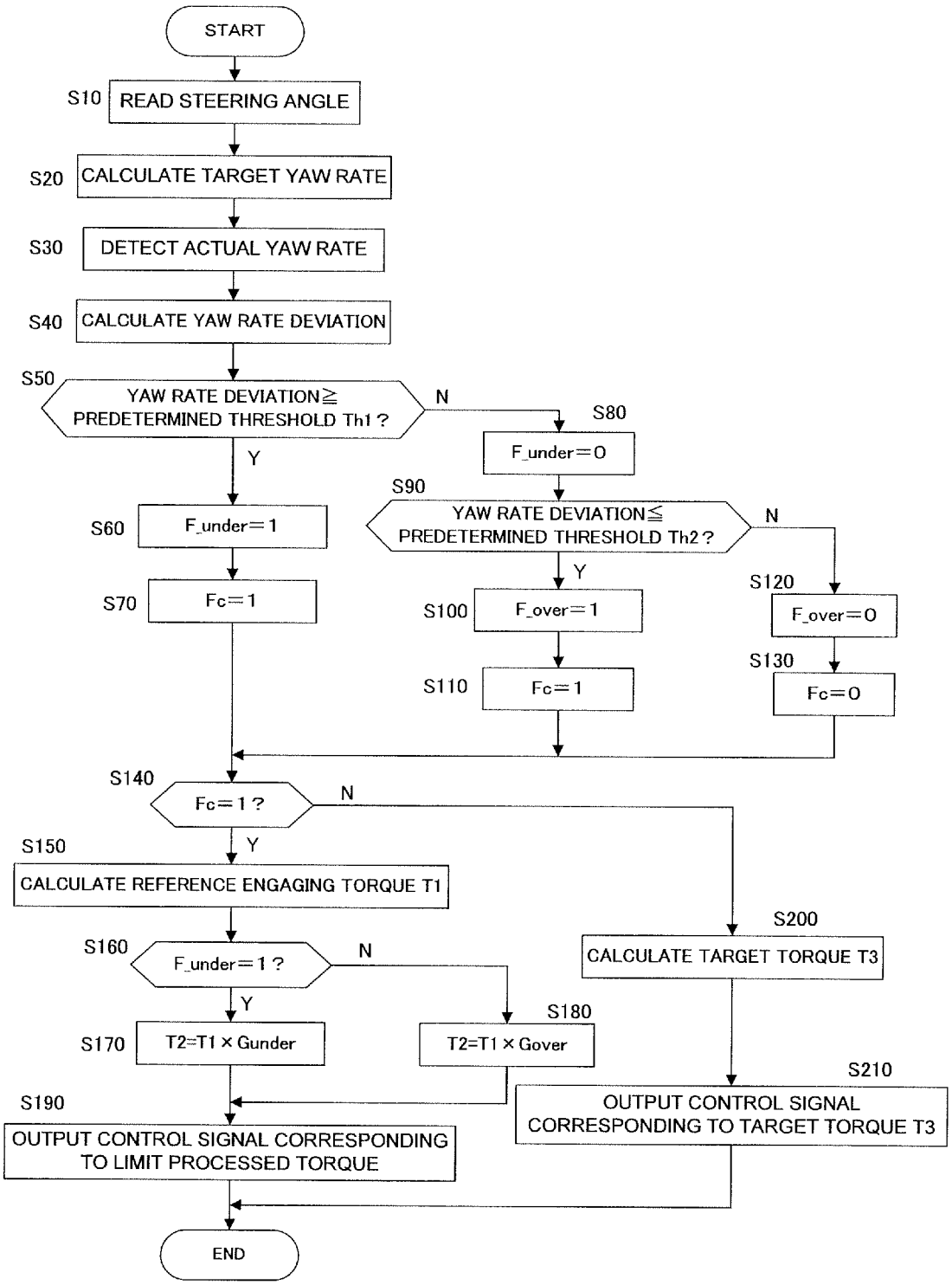
FIG. 2 is a flowchart showing the content of processing performed by a 4WD controller.

FIG. 2 is a flowchart showing the content of processing performed by the 4WD controller 13. When the signal input from the 4WD switch 14 following activation of the vehicle indicates a 4WD mode, the 4WD controller 13 starts the processing of a step S10.

In the step S10, the steering angle is read via the VDC controller 11, whereupon the routine advances to a step S20.

In the step S20, a target yaw rate of the vehicle is calculated on the basis of the steering angle read in the step S10 using a known method. Once the target yaw rate of the vehicle has been calculated, the routine advances to a step S30.

In the step S30, the actual yaw rate of the vehicle detected by the yaw rate sensor 16 is read, whereupon the routine advances to a step S40. In the step S40, a yaw rate deviation, i.e. a deviation between the target yaw rate calculated in the step S20 and the actual yaw rate read in the step S30, is calculated. Once the yaw rate deviation has been calculated, the routine advances to a step S50.

It should be noted that in the following description, it is assumed that when the vehicle is in an understeer condition, the yaw rate deviation is calculated as a positive value, and when the vehicle is in an oversteer condition, the yaw rate deviation is calculated as a negative value, regardless of whether leftward steering or rightward steering is underway. In other words, the yaw rate deviation is calculated during steering by subtracting the actual yaw rate from the target yaw rate.

In the step S50, a determination is made as to whether or not the yaw rate deviation calculated in the step S40 is equal to or larger than a predetermined threshold Th1. The predetermined threshold Th1 (Th1>0) is a threshold for determining whether or not the vehicle is in an understeer condition, which is set in advance to an appropriate value through experiment or the like. When it is determined that the yaw rate deviation is equal to or larger than the predetermined threshold Th1, the routine advances to a step S60.

In the step S60, the vehicle is determined to be in an understeer condition, and a flag F_under indicating that the vehicle is in an understeer condition is set at unity, whereupon the routine advances to a step S70. In the step S70, a correction control operation flag Fc is set at unity, whereupon the routine advances to a step S140.

Strictly speaking, a case in which the yaw rate deviation is greater than zero and lower than the predetermined threshold Th1 may also be referred to as an understeer condition. In this specification, however, the vehicle is defined as being in an understeer condition, such that the flag F_under is set at unity, when the yaw rate deviation is equal to or greater than the predetermined threshold Th1.

When the yaw rate deviation is determined to be lower than the predetermined threshold Th1 in the step S50, on the other hand, the routine advances to a step S80. In the step S80, the flag F_under indicating that the vehicle is in an understeer condition is set at zero, whereupon the routine advances to a step S90.

In the step S90, a determination is made as to whether or not the yaw rate deviation calculated in the step S40 is equal to or smaller than a predetermined threshold Th2. The predetermined threshold Th2 (Th2<0) is a threshold for determining whether or not the vehicle is in an oversteer condition, which is set in advance to an appropriate value through experiment or the like. When it is determined that the yaw rate deviation is equal to or smaller than the predetermined threshold Th2, the routine advances to a step S100.

In the step S100, the vehicle is determined to be in an oversteer condition, and a flag F_over indicating that the vehicle is in an oversteer condition is set at unity, whereupon the routine advances to a step S110. In the step S110, the correction control operation flag Fc is set at unity, whereupon the routine advances to the step S140.

Strictly speaking, a case in which the yaw rate deviation is greater than the predetermined threshold Th2 and lower than zero may also be referred to as an oversteer condition. In this specification, however, the vehicle is defined as being in an oversteer condition, such that the flag F_over is set at unity, when the yaw rate deviation is equal to or lower than the predetermined threshold Th2.

When the yaw rate deviation is determined to be greater than the predetermined threshold Th2 in the step S90, on the other hand, the routine advances to a step S120. In the step S120, the flag F_over indicating that the vehicle is in an oversteer condition is set at zero, whereupon the routine advances to a step S130. In this case, the yaw rate deviation is greater than the predetermined threshold Th2 (Th2<0) and smaller than the predetermined threshold Th1 (Th1>0), and therefore the behavior of the vehicle is normal. Hence, in the step S130, the correction control operation flag Fc is set at zero, whereupon the routine advances to the step S140.

In the step S140, a determination is made as to whether or not the correction control operation flag Fc is set at unity. When it is determined that the correction control operation flag Fc is set at unity, the routine advances to a step S150.

In the step S150, a reference engaging torque T1 of the torque distribution clutch 3 is determined. A method of calculating the reference engaging torque T1 will be described below.

First, a transfer output torque Tout is determined on the basis of the engine torque determined by the engine controller 12 using a known method. Next, a basic distribution torque Teng is determined by multiplying (rear load/total vehicle weight) by the determined output torque Tout. The basic distribution torque Teng is equal to a rear torque when the transfer output torque Tout is distributed in an identical distribution ratio to a wheel load distribution ratio of the front and rear wheels.

Finally, the reference engaging torque T1 is determined by multiplying a front-rear acceleration sensitive gain KG by the basic distribution torque Teng. By multiplying the front-rear acceleration sensitive gain KG by the basic distribution torque Teng, a dynamic load distribution torque T1, i.e. a rear torque distribution in which a rear load increment is increased during uphill travel or the like, is determined.

Here, the front-rear acceleration sensitive gain KG takes a value corresponding to the front-rear acceleration detected by the front-rear acceleration sensor 17, and increases as the front-rear acceleration increases. For example, data determining a relationship between the front-rear acceleration and the front-rear acceleration sensitive gain KG are prepared in advance, and by referring to these data, the front-rear acceleration sensitive gain KG is determined on the basis of the front-rear acceleration detected by the front-rear acceleration sensor 17.

Also in the step S150, processing is performed to limit the determined reference engaging torque T1 to a predetermined limit value Tlim1. More specifically, when the reference engaging torque T1 is larger than the predetermined limit value Tlim1, processing is performed to replace the value of the reference engaging torque T1 with the predetermined limit value Tlim1. The predetermined limit value Tlim1 is a threshold for preventing calculation errors. Once the processing of the step S150 is complete, the routine advances to a step S160.

In the step S160, a determination is made as to whether or not the flag F_under indicating that the vehicle is in an understeer condition is at unity. When the flag F_under is determined to be at unity, the routine advances to a step S170, and when the flag F_under is determined to be at zero, the routine advances to a step S180.

In the step S170, a corrected torque T2 is determined by multiplying an understeer correction gain Gunder (to be referred to simply as the correction gain Gunder hereafter) by the reference engaging torque T1 determined in the step S150.

Figure 3:
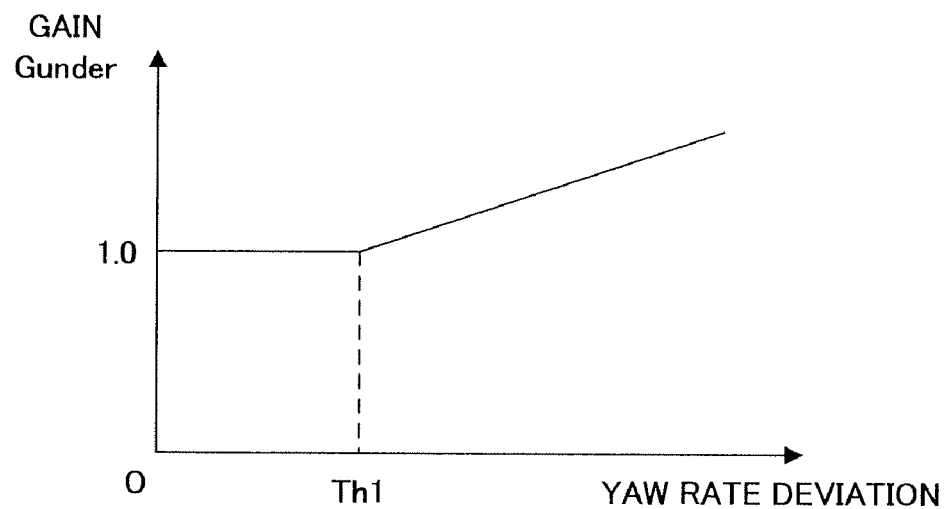
FIG. 3 is a view showing a relationship between a yaw rate deviation and a correction gain Gunder.

FIG. 3 is a view showing a relationship between the yaw rate deviation and the correction gain Gunder. As shown in FIG. 3, when the yaw rate deviation is equal to or smaller than the predetermined threshold Th1, the correction gain Gunder is set at 1.0, and as the yaw rate deviation increases beyond the predetermined threshold Th1, the value of the correction gain Gunder increases. Here, data determining the relationship shown in FIG. 3 between the yaw rate deviation and the correction gain Gunder are prepared in advance, and by referring to these data, the correction gain Gunder is determined on the basis of the yaw rate deviation determined in the step S40.

Meanwhile, in the step S180, the corrected torque T2 is determined by multiplying an oversteer correction gain Gover (to be referred to simply as the correction gain Gover hereafter) by the reference engaging torque T1 determined in the step S150.

Figure 4:
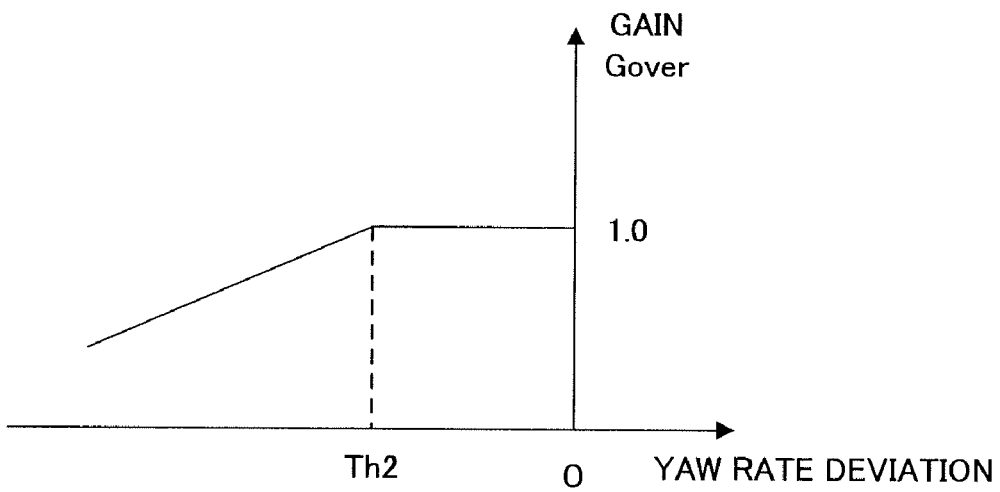
FIG. 4 is a view showing a relationship between the yaw rate deviation and a correction gain Gover.

FIG. 4 is a view showing a relationship between the yaw rate deviation and the correction gain Gover. As shown in FIG. 4, when the yaw rate deviation is equal to or larger than the predetermined threshold Th2, the correction gain Gover is set at 1.0, and as the yaw rate deviation decreases below the predetermined threshold Th2, the value of the correction gain Gover also decreases. Here, data determining the relationship shown in FIG. 4 between the yaw rate deviation and the correction gain Gover are prepared in advance, and by referring to these data, the correction gain Gover is determined on the basis of the yaw rate deviation determined in the step S40.

Once the processing of the step S170 or the step S180 is complete, the routine advances to a step S190. In the step S190, processing is performed to limit the determined corrected torque T2 to a predetermined limit value Tlim2. More specifically, when the corrected torque T2 is greater than the predetermined limit value Tlim2, the value of the corrected torque T2 is replaced by the predetermined limit value Tlim2.

Figure 5:
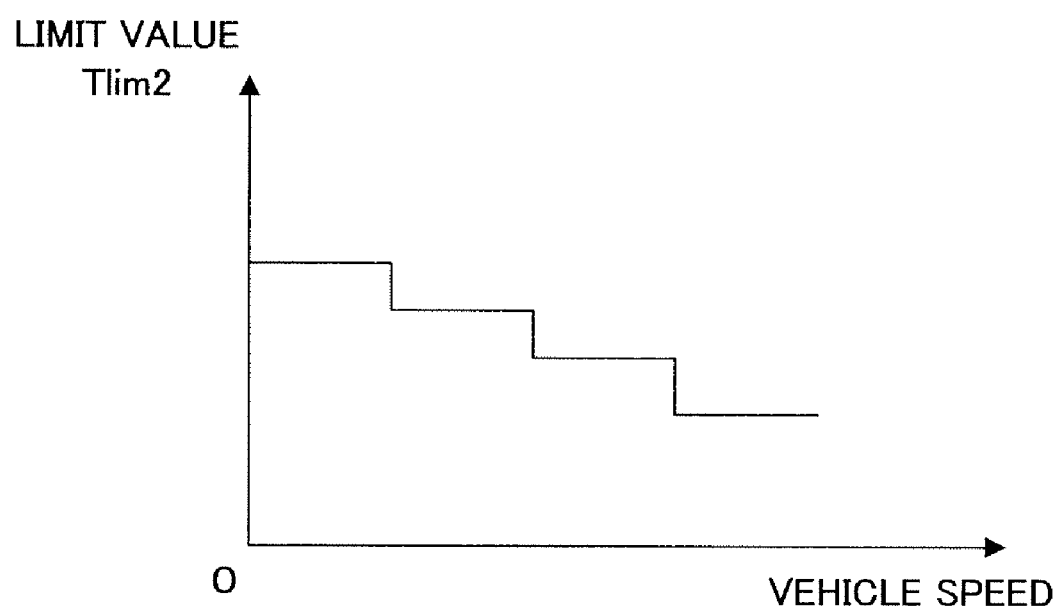
FIG. 5 is a view showing a relationship between a limit value Tlim2 and a vehicle speed.

FIG. 5 is a view showing a relationship between the limit value Tlim2 and the vehicle speed. This relationship is set such that as the vehicle speed increases, the value of the limit value Tlim2 decreases in accordance with reductions in a gear ratio of the transmission 2.

The 4WD controller 13 outputs a clutch control signal corresponding to the limit processed torque T2 to the torque distribution clutch 3. As a result, a clutch force corresponding to the target torque T2 is generated in the torque distribution clutch 3, and thus the driving force distribution of the front and rear wheels is controlled.

On the other hand, when it is determined in the step S140 that the correction control operation flag Fc is not set at unity, the routine advances to a step S200. In the step S200, a target torque T3 of the torque distribution clutch 3 is determined. A method of calculating the target torque T3 will be described below.

First, a front-rear wheel speed difference $\Delta Vw$ is determined on the basis of the speed of each wheel, determined on the basis of the output from the respective wheel speed sensors 24 to 27. More specifically, the front-rear wheel speed difference $\Delta Vw$ is determined by subtracting an average speed of a right rear wheel speed VwRR and a left rear wheel speed VwRL from an average speed of a right front wheel speed VwFR and a left front wheel speed VwFL. A torque $T\Delta V$ corresponding to the front-rear wheel speed difference $\Delta Vw$ is then determined by multiplying a gain KD by the front-rear wheel speed difference $\Delta Vw$. Similarly to the reference engaging torque T1, the torque $T\Delta V$ is the torque that is distributed to the rear wheels. The gain KD is determined on the basis of the vehicle speed and the left-right wheel speed difference of the front wheels, for example.

Further, the reference engaging torque T1 is determined on the basis of the engine torque output from the engine controller 12. Processing to determine the reference engaging torque T1 is identical to the processing of the step S150, and therefore detailed description thereof has been omitted.

Next, a target torque T3 is determined by comparing the torque T$\Delta$V to the reference engaging torque T1, selecting the larger value of the two, and limiting the selected torque using the predetermined limit value Tlim1.

In a step S210 that follows the step S200, a clutch control signal corresponding to the target torque T3 is output to the torque distribution clutch 3. As a result, a clutch force corresponding to the target torque T3 is generated in the torque distribution clutch 3, and thus the distribution of driving force to the front and rear wheels is controlled.

According to the driving force distribution control device for a four wheel drive vehicle of this embodiment, which comprises the torque distribution clutch 3 for distributing engine torque transmitted to the main drive wheel to the secondary drive wheel, the corrected torque T2 is calculated by determining a first engaging torque T1 of the torque distribution clutch 3 on the basis of the engine torque and correcting the determined reference engaging torque T1 on the basis of the yaw rate deviation between the target yaw rate and the actual yaw rate of the vehicle. Further, a second engaging torque T$\Delta$V of the torque distribution clutch 3 is determined on the basis of the rotation speed difference between the main drive wheel and the secondary drive wheel. When the yaw rate deviation is smaller than a positive first predetermined value Th1 or larger than a negative second predetermined value Th2, the torque distribution clutch 3 is controlled on the basis of the larger engaging torque of the first engaging torque T1 and second engaging torque T$\Delta$V, and when the yaw rate deviation is equal to or larger than the positive first predetermined value Th1 or equal to or smaller than the negative second predetermined value Th2, the torque distribution clutch 3 is controlled on the basis of the corrected torque T2. The pre-correction base torque T1 is determined on the basis of the engine torque, and therefore the torque T1 serving as a reference does not vary even when the rotation speed difference between the front and rear wheels varies during advancement on a slippery road surface or the like. As a result, variation in the torque distributed to the secondary drive wheels can be suppressed, and therefore hunting occurring during control of the secondary drive wheels can be suppressed.

When the yaw rate deviation is equal to or larger than the positive first predetermined value Th1 or equal to or smaller than the negative second predetermined value Th2, the base torque T1 is determined on the basis of the engine torque, and therefore hunting occurring during control of the secondary drive wheels can be suppressed even in a situation where the rotation speed difference between the front and rear wheels varies.

Further, when the yaw rate deviation is larger than the second predetermined value Th2 and smaller than the first predetermined value Th1, the torque distribution clutch 3 is controlled on the basis of the larger torque of the first engaging torque T1 and second engaging torque T$\Delta$V. Hence, a clutch engaging force that corresponds to the vehicle behavior can be obtained even when $\mu$ (the frictional coefficient) of the road surface varies, leading to variation in the rotation speed difference between the front and rear wheels, for example, and as a result, the behavior of the vehicle can be stabilized. When a yaw rate deviation occurs at this time, the target torque for controlling the torque distribution clutch 3 is not subjected to correction based on the yaw rate deviation. Accordingly, hunting caused by variation in the yaw rate deviation does not occur during control of the secondary drive wheels. It should be noted that since the yaw rate deviation is small, a problem does not occur even if the target torque for controlling the torque distribution clutch 3 is not corrected.

Also according to the driving force distribution control device for a four wheel drive vehicle of this embodiment, a correction is performed to increase the reference engaging torque T1 when the yaw rate deviation is equal to or larger than the first predetermined value Th1, whereas a correction is performed to reduce the reference engaging torque T1 when the yaw rate deviation is equal to or smaller than the second predetermined value Th2. As a result, an improvement in vehicle behavior stability with respect to a steering operation performed by the driver can be achieved.

Although the invention has been described above by reference to certain embodiment of the invention, the invention is not limited to the embodiment described above. Modifications and variations of the embodiment described above will occur to those skilled in the art, within the scope of the claims.

For example, in the above description, this invention is applied to a front wheel drive-based four wheel drive vehicle in which the torque distribution ratio of the rear wheels increases as the clutch engaging force of the torque distribution clutch 3 is increased. However, this invention may also be applied to a rear wheel drive-based four wheel drive vehicle in which the torque distribution ratio of the front wheels increases as the clutch engaging force of the torque distribution clutch 3 is increased.

Figure 6:
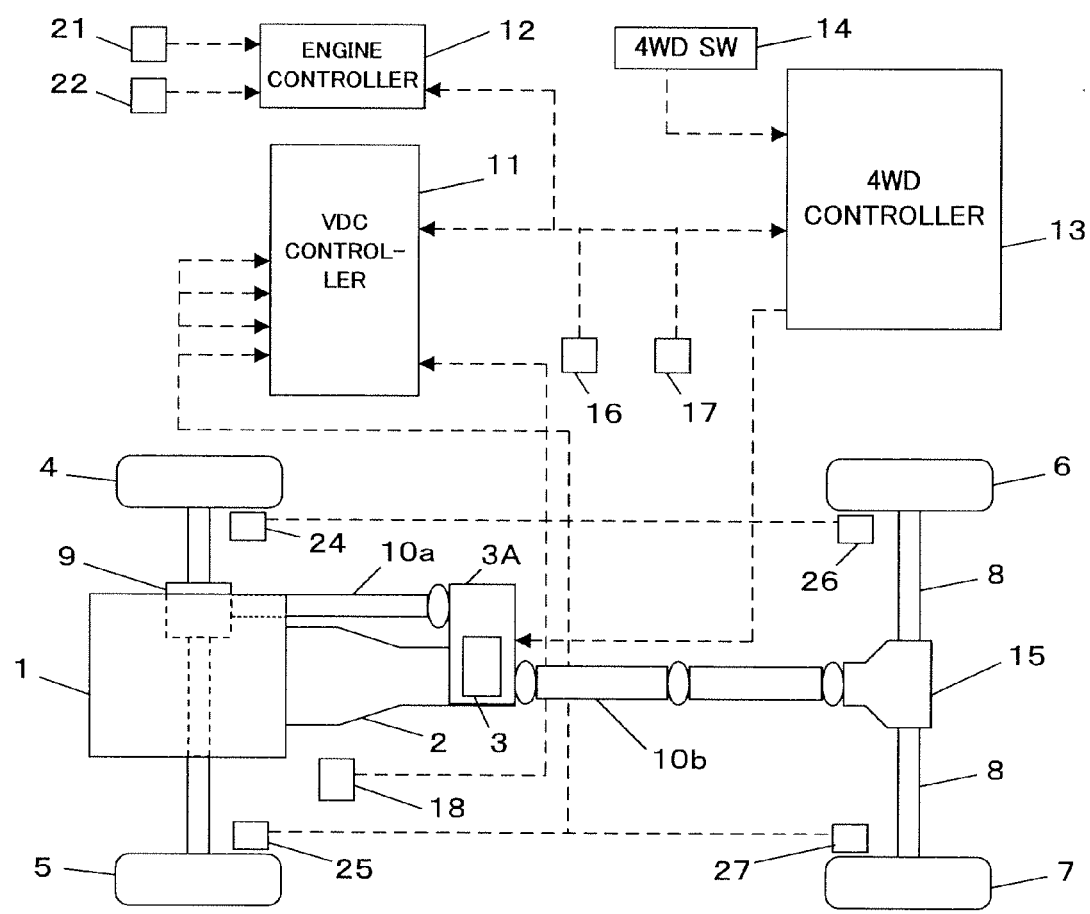
FIG. 6 is an overall system diagram of a driving force distribution control device for a rear wheel drive-based four wheel drive vehicle.

FIG. 6 is an overall system diagram of a driving force distribution control device for a rear wheel drive-based four wheel drive vehicle. Elements which are the same as those of FIG. 1 are denoted by the same reference numerals and the detail explanation thereof is omitted.

The driving force of the engine 1 is transmitted to a transfer 3A via the automatic transmission 2, and is distributed to the front wheels 4, 5 and the rear wheels 6, 7 by the torque distribution clutch 3 in the transfer 3A. To the front wheels 4, 5, the driving force of the engine 1 is transmitted via a front propeller shaft 10a and the front differential 9. To the rear wheels 6, 7, the driving force of the engine 1 is transmitted via a rear propeller shaft 10b, the rear differential 15 and the rear wheel drive shaft 8.

In a case where the invention is applied to a rear wheel drive-based four wheel drive vehicle, a correction to reduce the reference engaging torque T1 may be performed when the yaw rate deviation is equal to or larger than the first predetermined value Th1, and a correction to increase the reference engaging torque T1 may be performed when the yaw rate deviation is equal to or smaller than the second predetermined value Th2.

Figure 7:
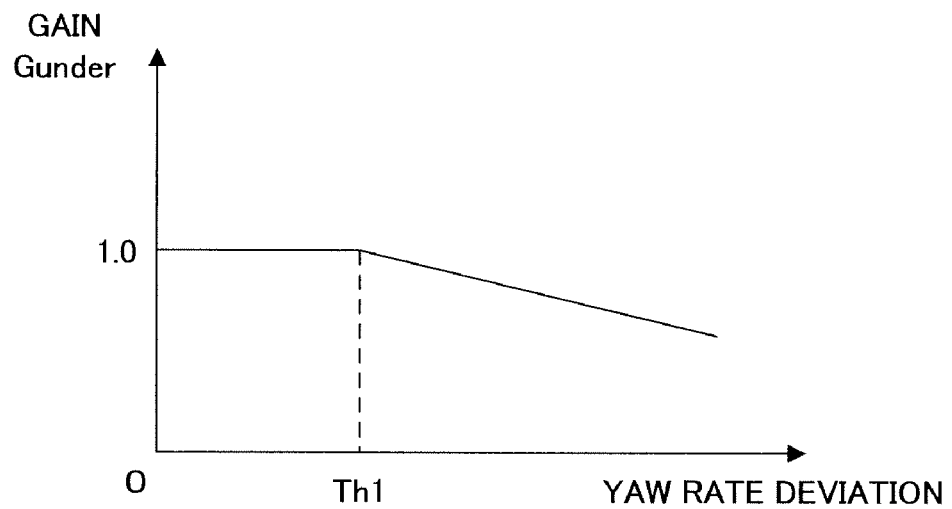
FIG. 7 is a view showing a relationship between a yaw rate deviation and a correction gain Gunder in the case where the invention is applied to the rear wheel drive-based four wheel drive vehicle.

FIG. 7 is a view showing a relationship between the yaw rate deviation and the correction gain Gunder in the case where the invention is applied to the rear wheel drive-based four wheel drive vehicle. As shown in FIG. 7, when the yaw rate deviation is equal to or smaller than the predetermined threshold Th1, the correction gain Gunder is set at 1.0, and as the yaw rate deviation increases beyond the predetermined threshold Th1, the value of the correction gain Gunder decreases. In the case where the invention is applied to the rear wheel drive-based four wheel drive vehicle, the correction gain Gunder is determined by using these data defining the relationship between the yaw rate deviation and the correction gain Gunder as shown in FIG. 7.

Figure 8:
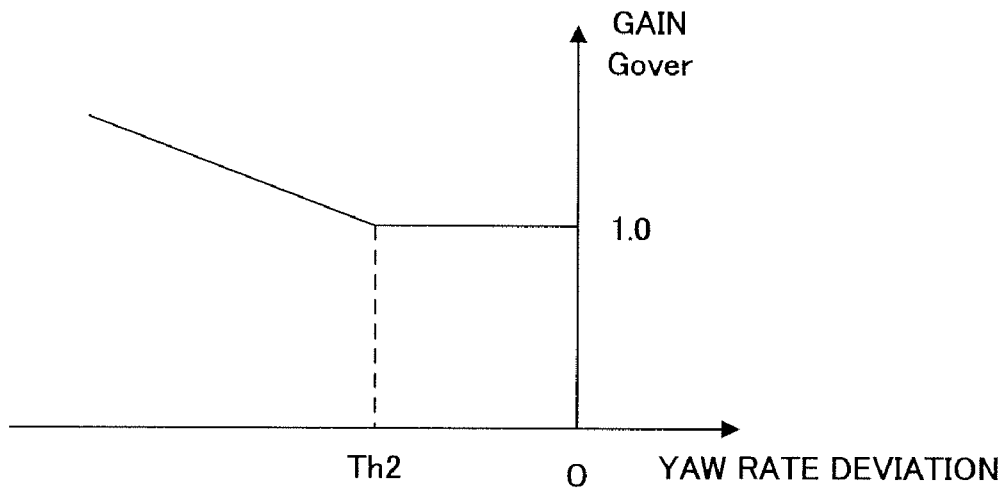
FIG. 8 is a view showing a relationship between the yaw rate deviation and a correction gain Gover in the case where the invention is applied to the rear wheel drive-based four wheel drive vehicle.

FIG. 8 is a view showing a relationship between the yaw rate deviation and the correction gain Gover in the case where the invention is applied to the rear wheel drive-based four wheel drive vehicle. As shown in FIG. 8, when the yaw rate deviation is equal to or larger than the predetermined threshold Th2, the correction gain Gover is set at 1.0, and as the yaw rate deviation decreases below the predetermined threshold Th2, the value of the correction gain Gover increases. In the case where the invention is applied to the rear wheel drive-based four wheel drive vehicle, the correction gain Gover is determined by using these data defining the relationship between the yaw rate deviation and the correction gain Gover as shown in FIG. 8.

The positive first predetermined value Th1 and an absolute value of the negative second predetermined value Th2 may be equal or different. In a case where the first predetermined value Th1 and the absolute value of the second predetermined value Th2 are equal, the torque distribution clutch 3 is controlled on the basis of the larger torque of the first engaging torque T1 and second engaging torque TΔV when an absolute value of the yaw rate deviation is smaller than the predetermined value Th1. When the absolute value of the yaw rate deviation is equal to or larger than the predetermined value, on the other hand, the torque distribution clutch 3 is controlled on the basis of the torque T2, which is obtained by correcting the first engaging torque T1 on the basis of the yaw rate deviation.

The torque of the engine 1, which is transmitted to the main drive wheel may be distributed to the secondary drive wheel by using a mechanism other than the torque distribution clutch 3.

As a mechanism that distributes the torque of the engine 1 to the secondary drive wheel, a generator driven by the engine 1 and a motor driven by the power generated by the generator may be used. In this case, a torque of the motor is transmitted to the secondary drive wheel.

The entire contents of Japanese Patent Application P2007-205592 (filed on Aug. 7, 2007) are incorporated herein by reference.

What is claimed is:

1. A driving force distribution control device for a four-wheel drive vehicle having a mechanism that distributes a torque of an engine, which is transmitted to a main drive wheel, to a secondary drive wheel, comprising:
   a first torque calculation unit configured to calculate a first torque to be distributed to the secondary drive wheel based on the torque of the engine;
   a yaw rate detection unit configured to detect a yaw rate of the vehicle;
   a target yaw rate calculation unit configured to calculate a target yaw rate of the vehicle;
   a yaw rate deviation calculation unit configured to calculate a yaw rate deviation between the calculated target yaw rate and the detected yaw rate;
   a torque correction unit configured to correct the first torque based on the yaw rate deviation;
   a rotation speed difference calculation unit configured to calculate a rotation speed difference between the main drive wheel and the secondary drive wheel;
   a second torque calculation unit configured to calculate a second torque to be distributed to the secondary drive wheel by the mechanism based on the rotation speed difference; and
   a control unit configured to control the mechanism so as to distribute a larger torque of the first torque and the second torque to the secondary drive wheel when an absolute value of the yaw rate deviation is smaller than a predetermined value, and to control the mechanism so as to distribute a corrected first torque corrected by the torque correction unit to the secondary drive wheel when the absolute value of the yaw rate deviation is equal to or larger than the predetermined value.

2. The driving force distribution control device for a four-wheel drive vehicle as defined in claim 1, wherein the mechanism has a clutch configured to distribute the torque of the engine to the secondary drive wheel,
   wherein the first torque calculation unit is configured to calculate a first engaging torque of the clutch based on the torque of the engine,
   wherein the yaw rate deviation calculation unit is configured to calculate the yaw rate deviation as a positive value when the detected yaw rate is smaller than the calculated target yaw rate,
   wherein the torque correction unit has an engaging torque correction unit configured to correct the first engaging torque based on the yaw rate deviation,
   wherein the second torque calculation unit is configured to calculate a second engaging torque of the clutch based on the rotation speed difference,
   wherein the predetermined value includes a positive first predetermined value and a negative second predetermined value, and
   wherein the control unit is configured to control the clutch on a basis of a larger engaging torque of the first engaging torque and the second engaging torque when the yaw rate deviation is smaller than the positive first predetermined value or larger than the negative second predetermined value, and to control the clutch on a basis of the corrected first engaging torque corrected by the torque correction unit when the yaw rate deviation is equal to or larger than the positive first predetermined value or equal to or smaller than the negative second predetermined value.

3. The driving force distribution control device for a four-wheel drive vehicle as defined in claim 2, further comprising a correction coefficient calculation unit configured to calculate a correction coefficient based on the yaw rate deviation,
   wherein the engaging torque correction unit is configured to correct the first engaging torque by multiplying the correction coefficient by the first engaging torque.

4. The driving force distribution control device for a four-wheel drive vehicle as defined in claim 2, wherein, in a case where the driving force distribution control device for the four-wheel drive vehicle is applied to a vehicle in which the main drive wheel is a front wheel and the secondary drive wheel is a rear wheel, the engaging torque correction unit is configured to perform a correction to increase the first engaging torque when the yaw rate deviation is equal to or larger than the positive first predetermined value.

5. The driving force distribution control device for a four-wheel drive vehicle as defined in claim 2, wherein, in a case where the driving force distribution control device for the four-wheel drive vehicle is applied to a vehicle in which the main drive wheel is a front wheel and the secondary drive wheel is a rear wheel, the engaging torque correction unit is configured to perform a correction to reduce the first engaging torque when the yaw rate deviation is equal to or smaller than the negative second predetermined value.

6. The driving force distribution control device for a four-wheel drive vehicle as defined in claim 2, wherein, in a case where the driving force distribution control device for the four-wheel drive vehicle is applied to a vehicle in which the main drive wheel is a rear wheel and the secondary drive wheel is a front wheel, the engaging torque correction unit is configured to perform a correction to reduce the first engaging torque when the yaw rate deviation is equal to or larger than the positive first predetermined value.

7. The driving force distribution control device for a four-wheel drive vehicle as defined in claim 2, wherein, in a case where the driving force distribution control device for the four-wheel drive vehicle is applied to a vehicle in which the main drive wheel is a rear wheel and the secondary drive wheel is a front wheel, the engaging torque correction unit is configured to perform a correction to increase the first engaging torque when the yaw rate deviation is equal to or smaller than the negative second predetermined value.

8. A driving force distribution control device for a four-wheel drive vehicle, in which a torque of an engine is distributed to a main drive wheel, to which the torque is transmitted during two-wheel driving, and a secondary drive wheel, to which a part of the torque is transmitted during four-wheel driving, comprising:
- a means for calculating a first torque to be distributed to the secondary drive wheel based on the torque of the engine;
- a means for detecting a yaw rate of the vehicle;
- a means for calculating a target yaw rate of the vehicle;
- a means for calculating a yaw rate deviation between the calculated target yaw rate and the detected yaw rate;
- a means for correcting the first torque based on the yaw rate deviation;
- a means for detecting a rotation speed of the main drive wheel;
- a means for detecting a rotation speed of the secondary drive wheel;
- a means for calculating a rotation speed difference between the rotation speed of the main drive wheel and the rotation speed of the secondary drive wheel;
- a means for calculating a second torque to be distributed to the secondary drive wheel based on the calculated rotation speed difference; and
- a means for distributing a larger torque of the first torque and the second torque to the secondary drive wheel when an absolute value of the yaw rate deviation is smaller than a predetermined value, and distributing a corrected first torque corrected based on the yaw rate deviation to the secondary drive wheel when the absolute value of the yaw rate deviation is equal to or larger than the predetermined value.

9. A driving force distribution method for a four-wheel drive vehicle, in which a torque of an engine is distributed to a main drive wheel, to which the torque is transmitted during two-wheel driving, and a secondary drive wheel, to which a part of the torque is transmitted during four-wheel driving, comprising:
- calculating a first torque to be distributed to the secondary drive wheel based on the torque of the engine;
- detecting a yaw rate of the vehicle;
- calculating a target yaw rate of the vehicle;
- calculating a yaw rate deviation between the calculated target yaw rate and the detected yaw rate;
- correcting the first torque based on the yaw rate deviation;
- detecting a rotation speed of the main drive wheel;
- detecting a rotation speed of the secondary drive wheel;
- calculating a rotation speed difference between the rotation speed of the main drive wheel and the rotation speed of the secondary drive wheel;
- calculating a second torque to be distributed to the secondary drive wheel based on the calculated rotation speed difference;
- distributing a larger torque of the first torque and the second torque to the secondary drive wheel when an absolute value of the yaw rate deviation is smaller than a predetermined value; and
- distributing a corrected first torque corrected based on the yaw rate deviation to the secondary drive wheel when the absolute value of the yaw rate deviation is equal to or larger than the predetermined value.

10. A driving force distribution control device for a four-wheel drive vehicle having a mechanism configured to distribute a torque of an engine to a main drive wheel and a secondary drive wheel, comprising:
- a yaw rate detection unit configured to detect a yaw rate of the vehicle; and
- a controller, wherein the controller is configured to:
    - calculate a first torque to be distributed to the secondary drive wheel based on the torque of the engine;
    - calculate a target yaw rate of the vehicle;
    - calculate a yaw rate deviation between the calculated target yaw rate and the detected yaw rate;
    - correct the first torque based on the yaw rate deviation to obtain a corrected first torque;
    - calculate a rotation speed difference between the main drive wheel and the secondary drive wheel;
    - calculate a second torque to be distributed to the secondary drive wheel by the mechanism based on the rotation speed difference; and
    - control the mechanism so as to distribute a larger torque of the first torque and the second torque to the secondary drive wheel when an absolute value of the yaw rate deviation is smaller than a predetermined value, and
    - control the mechanism so as to distribute the corrected first torque to the secondary drive wheel when the absolute value of the yaw rate deviation is larger than the predetermined value.

* * * * *